United States Patent Office 3,260,755
Patented July 12, 1966

---

3,260,755
PREPARATION OF AROMATIC DISULFIDES
Edward J. McNelis, Wallingford, Pa., assignor to Sun Oil Company, Philadelphia, Pa., a corporation of New Jersey
No Drawing. Filed Aug. 23, 1963, Ser. No. 304,264
14 Claims. (Cl. 260—608)

This invention relates to aromatic disulfides and more particularly to a method for preparing such disulfides by heating an aromatic mercaptan or a derivative thereof in the presence of activated manganese dioxide in accordance with the following reaction

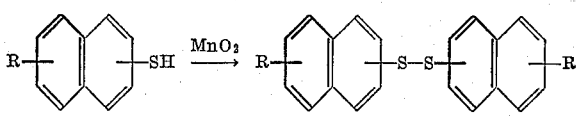

wherein R is selected from the group consisting of hydrogen and alkyl radicals having from 1 to 15 carbon atoms.

Aromatic disulfides, particularly 2-naphthyl disulfide, are particularly useful as moderators in styrene polymerization. They are also useful as thermochromes. These materials heretofore have been prepared by the air oxidation of a basic solution of the aromatic mercaptan or by the iodine oxidation of the mercaptans.

A method has now been found whereby aromatic disulfides can be prepared directly from aromatic mercaptan or a derivative thereof utilizing activated manganese dioxide.

Briefly, the instant invention comprises heating an aromatic mercaptan or a derivative thereof in the presence of activated manganese dioxide at a temperature ranging between 20° C. and 250° C. for a period of time ranging between 5 minutes and 25 hours and recovering an aromatic disulfide product.

"Activated manganese dioxide" is a well known material (see Evans, Quarterly Reviews, 13, pp. 61–70, 1959). It is a form of hydrated manganese dioxide and is generally prepared by reacting manganese sulfate with potassium permanganate in a hot aqueous solution in the presence of sufficient alkali to insure that the reaction mixture remains alkaline after being washed with water. The resulting slurry is dried at 100°–120° C. and activated manganese dioxide is recovered. It can also be prepared by reacting manganese sulfate and potassium permanganate in a hot aqueous solution in the absence of any alkali. The resulting mixture becomes strongly acidic and after drying the slurry at 100°–120° C., activated manganese dioxide is recovered. Activated manganese dioxide is also prepared by heating manganese oxalate or manganese carbonate at 250° C. The resulting product may be used as produced or it can be washed with dilute aqueous nitric acid and subsequently dried at 230° C.

Suitable starting materials which can be used to prepare the aromatic disulfides in accordance with the instant invention have the general formula

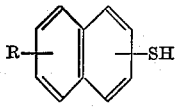

wherein R is selected from the group consisting of hydrogen and alkyl radicals containing from 1 to 15 carbon atoms. Examples of specific compounds include 1-naphthyl mercaptan, 2-naphthyl mercaptan, 1-mercapto-5-methylnaphthalene, 2 - mercapto - 6 - ethylnaphthalene, 1-mercapto - 7-propylnaphthalene, 2-mercapto-8-isopropyl-naphthalene, 1-mercapto-5-sec-butylnaphthalene , 2-mercapto - 6-t-butylnaphthalene, 1-mercapto-7-amylnaphthalene, 2-mercapto-8-neohexylnaphthalene, etc.

As stated above, in accordance with this invention, an aromatic mercaptan or derivative thereof is heated in the presence of activated manganese dioxide to produce aromatic disulfides. The aromatic mercaptan or derivative thereof is heated with the activated manganese dioxide either in the presence or absence of a solvent material and in the absence of air.

It is preferred that prior to heating the aromatic mercaptan or derivative thereof in the presence of activated manganese dioxide, that it be dissolved in a suitable solvent and that the activated manganese dioxide be added to the resulting solution. Examples of suitable solvents include chloroform, benzene, toluene, diethyl ether, and petroleum ether. Chloroform and benzene are the preferred solvents.

The temperature at which either the aromatic mercaptan or derivative thereof and activated manganese dioxide or solution of aromatic mercaptan or derivative thereof and activated manganese dioxide is heated can vary over a wide range. It has been found that substantial amounts of aromatic disulfide products are produced at a temperature as low as 20° C. If the aromatic mercaptan or derivative is not contained in a solvent, the maximum temperature at which the reaction mass can be heated is governed only by the decomposition temperature of the mercaptan. If the aromatic mercaptan or derivative thereof is dissolved in a solvent prior to the addition thereto of the activated manganese dioxide, the maximum temperature at which the reaction mass can be heated is governed by the boiling point of the solvent at the pressure used. While temperatures ranging between about 20° C. to as high as 250° C. can be used in this invention, it is preferred that a temperature ranging between about 60° C. and 200° C. be used.

The time that the reaction mixture is heated can vary between 5 minutes and 25 hours. It is preferred that the heating time range between about 0.5 hour and 2 hours.

The molar ratio of activated manganese dioxide to aromatic mercaptan or derivative thereof can also vary over wide limits. It has been found that if trace amounts of activated manganese dioxide are present in the reaction mass, there is produced some disulfide product. It is preferred, however, that in order to optimize the yield of disulfide, the molar ratio of activated manganese dioxide to aromatic mercaptan or derivative thereof should range between about 0.5:1 and 100:1, with a molar ratio ranging between about 3:1 and 10:1 being most preferred.

To recover the desired product, the reaction mass is first separated such as by filtration and evaporation of the filtrate to dryness. The residue is the crude aromatic disulfide which can be purified by crystallization from a benzene-methanol solvent mixture.

The following example serves to further illustrate the instant invention.

Example 2-naphthyl mercaptan (4.8 g.) was dissolved in chloroform (50 ml.). This solution was refluxed over activated manganese dioxide (8.7 g.) for two hours in a nitrogen atmosphere. After reaction the chloroform solution was separated by filtration and the chloroform was stripped therefrom on a steam bath with a nitrogen bleed. The residue after evaporation was treated with ethyl ether (300 ml.). Most of the residue (3.64 g.) did not dissolve. That which did dissolve (0.738 g.) was washed with 200 ml. of 5% sodium hydroxide and 200 ml. of 20% hydrochloric acid. The ether solution was dried over magnesium sulfate. Upon evaporation of the ether, the residue (0.665 g.) was subjected to infrared analysis. The spectrum produced was the same as that of the ether insoluble portion as well as an authentic sample of 2-naphthyl disulfide, prepared by the method of A. H. Weinstein and R. M. Pierson (J. Org. Chem., 23, 557 (1958)). The soluble and insoluble fractions were further treated with low-boiling petroleum ether (400 mol.) to give fractions whose infrared spectra were the same as 2-naphthyldisulfide. The ether insoluble fraction was crystallized from benzene-methanol. A mixed melting point determination was identical to that of authentic 2-naphthyl disulfide, M.P. 141.5–142.5° C. The yield of 2-naphthyl disulfide was 90%.

The invention claimed is:

1. Method for preparing aromatic disulfides having the general formula

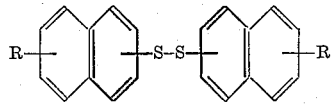

wherein R is selected from the group consisting of hydrogen and an alkyl radical containing from 1 to 15 carbon atoms which comprises heating an aromatic mercaptan having the general formula

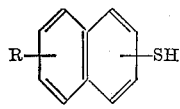

in the presence of activated manganese dioxide at a temperature in the range of from 20° C. to 250° C. for a period of time in the range of from 5 minutes to 25 hours and thereafter recovering said aromatic disulfide.

2. Method in accordance with claim 1 wherein the temperature is in the range of from 60° C. to 200° C. for a period of time in the range of from 0.5 hour to 2 hours.

3. Method for preparing aromatic disulfides having the general formula

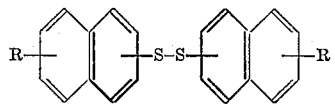

wherein R is selected from the group consisting of hydrogen and an alkyl radical containing from 1 to 15 carbon atoms which comprises dissolving an aromatic mercaptan having the general formula

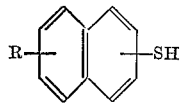

in a solvent and heating the resulting solution in the presence of activated manganese dioxide at a temperature in the range of from 20° C. to 250° C. for a period of time in the range of from 5 minutes to 25 hours and thereafter recovering said aromatic disulfide.

4. Method in accordance with claim 3 wherein said solvent is selected from the group consisting of chloroform, benzene, toluene, diethyl ether, and petroleum ether.

5. Method in accordance with claim 4 wherein the temperature is in the range of from 60° C. to 200° C. for a period of time in the range of from 0.5 hour to 2 hours.

6. Method in accordance with claim 3 wherein the temperature is in the range of from 60° C. to 200° C. for a period of time in the range of from 0.5 hour to 2 hours.

7. Method for preparing aromatic disulfides having the general formula

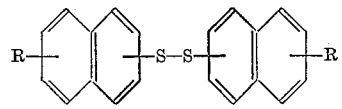

wherein R is selected from the group consisting of hydrogen and an alkyl radical containing from 1 to 15 carbon atoms which comprises heating an aromatic mercaptan having the general formula

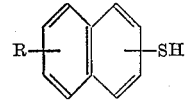

in the presence of from 0.5 to 100.0 moles of activated manganese dioxide per mole of aromatic mercaptan at a temperature in the range of from 20° C. to 250° C. for a period of time in the range of from 5 minutes to 25 hours and thereafter recovering said aromatic disulfide.

8. Method in accordance with claim 7 wherein the molar ratio of activated manganese dioxide to aromatic mercaptan ranges between 3.0–1.0 and 10.0–1.0.

9. Method for preparing naphthalene disulfide having the formula

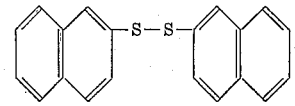

which comprises heating 2-naphthyl mercaptan in the presence of from 0.5 to 100.0 moles of activated manganese dioxide per mole of aromatic mercaptan at a temperature in the range of from 20° C. to 250° C. for a period of time in the range of from 5 minutes to 25 hours and thereafter recovering said aromatic disulfide.

10. Method in accordance with claim 9 wherein the molar ratio of activated manganese dioxide to aromatic mercaptan ranges between 3.0–1.0 and 10.0–1.0.

11. Method for preparing naphthalene disulfide having the formula

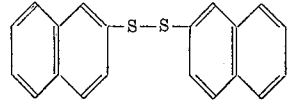

which comprises dissolving 2-naphthyl mercaptan in a solvent and heating the resulting solution in the presence of from 0.5 to 100.0 moles of activated manganese dioxide per mole of aromatic mercaptan at a temperature in the range of from 20° C. to 250° C. for a period of time in the range of from 5 minutes to 25 hours and thereafter recovering said aromatic disulfide.

12. Method in accordance with claim 11 wherein the molar ratio of activated manganese dioxide to aromatic mercaptan ranges between 3.0–1.0 and 10.0–1.0.

13. Method in accordance with claim 12 wherein said solvent is selected from the group consisting of chloroform, benzene, toluene, diethyl ether, and petroleum ether.

14. Method in accordance with claim 1 wherein said solvent is selected from the group consisting of chloroform, benzene, toluene, diethyl ether, and petroleum ether.

No references cited.

CHARLES B. PARKER, *Primary Examiner.*

DELBERT R. PHILLIPS, *Assistant Examiner.*